US007122129B2

(12) United States Patent
Yagi et al.

(10) Patent No.: US 7,122,129 B2
(45) Date of Patent: Oct. 17, 2006

(54) FLUORESCENT SUBSTANCE AND FLUORESCENT COMPOSITION CONTAINING THE SAME

(75) Inventors: Yasuhiro Yagi, Tsukuba (JP); Kenzou Susa, Tsukuba (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/945,947

(22) Filed: Sep. 22, 2004

(65) Prior Publication Data

US 2005/0040366 A1    Feb. 24, 2005

Related U.S. Application Data

(63) Continuation of application No. PCT/JP03/03821, filed on Mar. 27, 2003.

(30) Foreign Application Priority Data

Mar. 28, 2002 (JP) ............... 2002-092483

(51) Int. Cl.
*G01T 1/20* (2006.01)
(52) U.S. Cl. .................. 252/301.4 F; 252/301.36; 250/370.11
(58) Field of Classification Search ............ 501/32; 252/301.4 F, 301.36, 301.17; 117/942; 250/361 R, 250/483.1
See application file for complete search history.

(56) References Cited

U.S. PATENT DOCUMENTS

| | | | | |
|---|---|---|---|---|
| 3,715,611 A | * | 2/1973 | De Mesquita et al. ...... 313/468 |
| 4,101,781 A | * | 7/1978 | Neukermans et al. .... 250/483.1 |
| 4,185,201 A | * | 1/1980 | Stevels .................... 250/483.1 |
| 4,208,611 A | * | 6/1980 | Watanabe et al. ........... 313/487 |
| 4,316,817 A | * | 2/1982 | Cusano et al. .......... 252/301.18 |
| 4,418,452 A | * | 12/1983 | Kuhl et al. .................... 445/35 |
| 5,663,005 A | * | 9/1997 | Dooms et al. .............. 428/690 |
| 6,437,336 B1 | * | 8/2002 | Pauwels et al. ......... 250/361 R |

FOREIGN PATENT DOCUMENTS

| | | |
|---|---|---|
| JP | 54-62988 A | 5/1979 |
| JP | 56-5883 A | 1/1981 |
| JP | 56-155283 A | 12/1981 |
| JP | 57-131278 A | 8/1982 |
| JP | 4-214788 | 8/1992 |
| JP | 2002-80847 A | 3/2002 |

OTHER PUBLICATIONS

Abstract for JP 56-5883, Jan. 21, 1981.*
Translation for JP 2002-80847, Mar. 22, 2002.*

* cited by examiner

*Primary Examiner*—C. Melissa Koslow
(74) *Attorney, Agent, or Firm*—Antonelli, Terry, Stout and Kraus, LLP.

(57) ABSTRACT

The present invention provides a fluorescent substance represented by the following general formula: $(A_{1-x}B_x)_2Si_2O_7$, wherein A is at least one member selected from the group consisting of Gd, Y, Lu and La, B is at least one member selected from the group consisting of rare earth elements other than A and x is a numerical value specified by the formula: $0<x\leq0.2$ and which can emit light rays having a wavelength falling within the range of ultraviolet, visible and infrared regions in response to, for instance, optical stimuli, electron beam stimuli, electric field stimuli, stress stimuli and radiation stimuli; a fluorescent composition comprising such a fluorescent substance dispersed in a silica glass matrix; and a scintillator obtained using the foregoing substance or composition. These fluorescent substance, fluorescent composition, scintillator material and fluorescent material have high luminous outputs and are excellent in the processability.

12 Claims, 1 Drawing Sheet

FLUORESCENT SUBSTANCE AND FLUORESCENT COMPOSITION CONTAINING THE SAME

This application is a Continuation application of International (PCT) Patent Application No. PCT/JP03/03821, filed Mar. 27, 2003.

TECHNICAL FIELD

The present invention relates to a novel fluorescent substance capable of being used as, for instance, a scintillator employed in a radiation detector, a phosphor for a plasma display, a phosphor for a cathode ray tube (Braun tube), a phosphor for an electro-luminescence and a phosphor for a stress sensor as well as a fluorescent composition containing the novel fluorescent substance.

BACKGROUND ART

In the scintillators used in a variety of radiation detectors or sensors, there have mainly been used single crystalline materials. In particular, the γ-ray detector requires the use of a large-scale single crystal having a high density and constituted by heavy elements. In addition, such a single crystal should have a high emission or luminous strength and the wavelength of the light emitted from the single crystal should likewise be adapted to the highly sensitive range of the optical detector. For this reason, there has presently been used the single crystal of cerium (3+)-added gadolinium (3+) orthosilicate (cerium-activated $Gd_2SiO_5$, commonly referred to as "GSO") as the most excellent material for such a scintillator.

However, the GSO single crystal has a strong crystalline anisotropy, the production thereof requires the use of a technology of a high order and therefore, the resulting single crystalline material is quite expensive. On the other hand, various kinds of fluorescent substances have been used in other applications, but there has been desired for the development of a fluorescent substance excellent in processability other than single crystalline ones and there has also been desired for the development of a fluorescent substance, having a good luminous efficiency from the viewpoint of the reduction of the electric power consumption of a variety of devices.

For instance, Japanese Un-Examined Patent Publication 2001-282153 discloses a method for the preparation of UV fluorescent glass containing a rare earth element-containing oxide, but the glass comprises $CeO_2$ as a fluorescent component and this article does not disclose, at all, a fluorescent substance represented by the general formula: $(A_{1-x}B_x)_2Si_2O_7$.

In addition, there is disclosed, in S. W. Lu et al., J. Phys. Chem. Solids, 2001, 62:777–781, a method for the preparation of $Mn^{2+}$-activated $Zn_2SiO_4$ powder, but this article does not disclose such a fluorescent substance represented by the general formula: $(A_{1-x}B_x)_2Si_2O_7$.

DISCLOSURE OF THE INVENTION

Accordingly, it is an object of the present invention to provide a fluorescent substance having a high light-emitting power (luminous power or output) and excellent processability.

It is another object of the present invention to provide a fluorescent composition having a high light-emitting power and excellent processability.

It is a further object of the present invention to provide a scintillator having a high light-emitting power and excellent processability.

According to the present invention, there are provided a fluorescent substance, a fluorescent composition containing the fluorescent substance and a scintillator specified below:
1. A fluorescent substance represented by the following general formula: $(A_{1-x}B_x)_2Si_2O_7$ (in the formula, A is at least one member selected from the group consisting of Gd, Y, Lu and La, B is at least one member selected from the group consisting of rare earth elements other than A and x is a numerical value specified by the formula: $0<x\leq0.2$).
2. The fluorescent substance according to the foregoing item 1, wherein x is a numerical value specified by the formula: $0.005\leq x\leq0.06$.
3. The fluorescent substance according to the foregoing item 1 or 2, wherein it has a structure represented by the formula: $Gd_2Si_2O_7$.
4. The fluorescent substance according to any one of the foregoing items 1 to 3, wherein A is Gd and B is Ce, Tb or Eu.
5. The fluorescent substance according to the foregoing item 4, wherein B is Ce.
6. A fluorescent composition comprising at least 5% by mass of the fluorescent substance as set forth in any one of the foregoing items 1 to 5.
7. A fluorescent composition comprising a matrix and at least 5% by mass of the fluorescent substance as set forth in any one of the foregoing items 1 to 5, incorporated into the matrix.
8. The fluorescent composition according to the foregoing item 7, wherein the matrix is at least one member selected from the group consisting of silica glass, borosilicate glass, quartz and cristobalite.
9. The fluorescent composition according to the foregoing item 7, wherein the matrix is a polymer resin.
10. A scintillator comprising the fluorescent substance as set forth in any one of the foregoing items 1 to 5 or the fluorescent composition as set forth in any one of the foregoing items 6 to 9.
11. A radiation detector using the scintillator as set forth in the foregoing item 10.

BEST MODE FOR CARRYING OUT THE INVENTION

Figure 1:
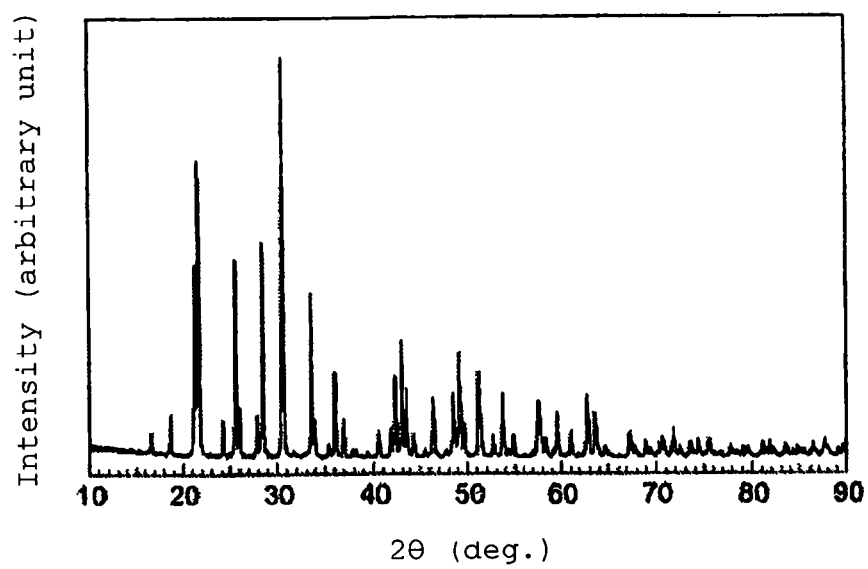
FIG. 1 is a diagram showing the X-ray diffraction pattern observed for the powdery fluorescent substance prepared in Example 1.

The fluorescent substance of the present invention is represented by the general formula: $(A_{1-x}B_x)_2Si_2O_7$ (in the formula, A is at least one member selected from the group consisting of Gd, Y, Lu and La, B is at least one member selected from the group consisting of rare earth elements other than A and x is a numerical value specified by the formula: $0<x\leq0.2$). Examples of rare earth elements other than A include Ce, Tb, Eu, Sc, Pr, Nd, Pm, Sm, Dy, Ho, Er, Tm and Yb, with Ce, Tb and Eu being preferred and Ce being more preferred.

The fluorescent substance of the present invention can be prepared by admixing raw materials for the A, B and Si components in a predetermined rate and then calcining or burning the resulting mixture. More specifically, there are first prepared a raw material for the A component (such as a nitrate), a raw material for the B component (for instance, a nitrate) and a raw material for the Si component (for instance, silicic acid ester such as tetraethyl orthosilicate). To an ethanol solution consisting of tetraethyl orthosilicate, water and hydrochloric acid, there is added an aqueous solution containing the foregoing ingredients for the components A and B in such an amount that the resulting mixture has a desired composition to thus prepare a precursor solution for the preparation of a desired composition. Then the foregoing precursor solution is dropwise added to a concentrated aqueous ammonia, for instance, 25% aqueous ammonia, containing a surfactant such as Tween (trade name), with stirring. The resulting precipitates are separated by centrifugation or filtration, followed by drying the same at room temperature or in a dryer to thus obtain a sample of a powdery raw material.

The powdery raw material is heat-treated at a temperature ranging from 1000 to 2000° C. and preferably 1200 to 1700° C. to thus form a fluorescent substance.

The fluorescent substance of the present invention may be used in the form of powder or a molded body depending on various applications. For instance, when the foregoing powdery raw material is heat-treated at a temperature ranging from 1200 to 1700° C., for instance, 1500° C. for 1 to 10 hours in the air, a powdery sample or a fluorescent substance according to the invention can be obtained.

Alternatively, when the foregoing powdery raw material is subjected to press molding under a molding pressure of about 100 MPa and then to a heat-treatment at a temperature ranging from 1200 to 1700° C., for instance, 1500° C. for 1 to 10 hours in the air to thus form a solid molded sample or a fluorescent substance according to the present invention. In this respect, it is preferred to calcine the powdery raw material at a temperature ranging from 600 to 1200° C., for instance, 1100° C. for 1 to 10 hours prior to the press molding of the same, from the viewpoint of the prevention of any breakage of the molded body.

The fluorescent substance of the present invention can emit light rays having a wavelength falling within the range of ultraviolet, visible and infrared regions in response to, for instance, optical stimuli, electron beam stimuli, electric field stimuli, stress stimuli and radiation stimuli. For instance, when the powdery or molded sample of a fluorescent substance prepared above is irradiated with the light rays from an ultraviolet lamp, there can be observed light rays emitted from the substance.

Further, a material such as a raw material for the Si component, boric acid and/or an alkali metal may be added to the foregoing raw components of the fluorescent substance and the resulting mixture is calcined to thus form a fluorescent composition comprising the fluorescent substance dispersed in a matrix of, for instance, silica glass, borosilicate glass, quartz or cristobalite. The shapes of these fluorescent composition can easily be changed by the application of heat.

For instance, a fluorescent composition comprising a matrix of silica glass or borosilicate glass and the foregoing fluorescent substance (crystalline material) dispersed in the matrix can be finished into any desired shape such as a thin film-like, plate-like or spherical shape. Moreover, it is also possible to form a fluorescent composition whose matrix consists of quartz or cristobalite.

Furthermore, a polymer resin can be used as a material for such a matrix. For instance, a translucent or transparent fluorescent composition can be obtained by dispersing a powdery sample of a fluorescent substance in a polymer resin or impregnating pores of a molded sample of the fluorescent substance with a polymer resin. This composition can emit purple to blue light rays when irradiated with ultraviolet rays. Such a polymer resin is preferably one whose refractive index is close to that (about 1.7) of the crystals present in the fluorescent substance, more preferably a polymer resin whose refractive index is controlled to the range of from 1.5 to 1.9 and further preferably a polymer resin having a refractive index ranging from 1.6 to 1.8. Examples of such polymer resins are epoxy resins and acrylic resins.

When the foregoing fluorescent substance has a crystalline structure similar to that observed for $Gd_2Si_2O_7$, the luminous strength thereof is higher than that of GSO and therefore, not only the simple fluorescent substance (crystalline material), but also a composition comprising the same can significantly be improved in the light-emission power.

The present invention will hereunder be described in more detail with reference to the following Examples.

EXAMPLE 1

A fluorescent substance was prepared according to the following method while selecting Gd and Ce as the constituent elements A and B of the composition according to the present invention and aiming at 0.05 for the value x.

There were prepared gadolinium (3+) nitrate hexahydrate, cerium (3+) nitrate hexahydrate and tetraethyl orthosilicate as raw materials for Gd, Ce and Si components, respectively. To 40 ml of an ethanol solution of a silica sol comprising 8.33 g of tetraethyl orthosilicate, 1 ml of water and 2 ml of a 1M hydrochloric acid solution, there were added 152 ml of a 0.25 mole % aqueous solution of the foregoing gadolinium (3+) nitrate hexahydrate and 20 ml of a 0.1 mole % aqueous solution of the foregoing cerium (3+) nitrate hexahydrate to thus prepare a solution of a precursor for the intended composition. Then the foregoing precursor solution was dropwise added to 224 ml of 25% aqueous ammonia containing 0.96 g of Tween (trade name) 60. The resulting precipitates were isolated by centrifugation or filtration and then dried at room temperature or a dryer to thus give 11.9 g of a powdery sample. Then the sample was heat-treated at a temperature of 1500° C. in the air to thus form 9.5 g of a powdery sample.

The foregoing sample heat-treated at 1500° C. was analyzed or inspected for the composition and as a result, it was found that the sample had a composition quite close to the target one or it comprised 47.3% of Gd, 2.5% of Ce and 50.2% of Si as expressed in terms of the atomic ratio. When the sample was irradiated with the light rays emitted from a UV lamp, there was observed the emission of purple light rays.

Figure 2:
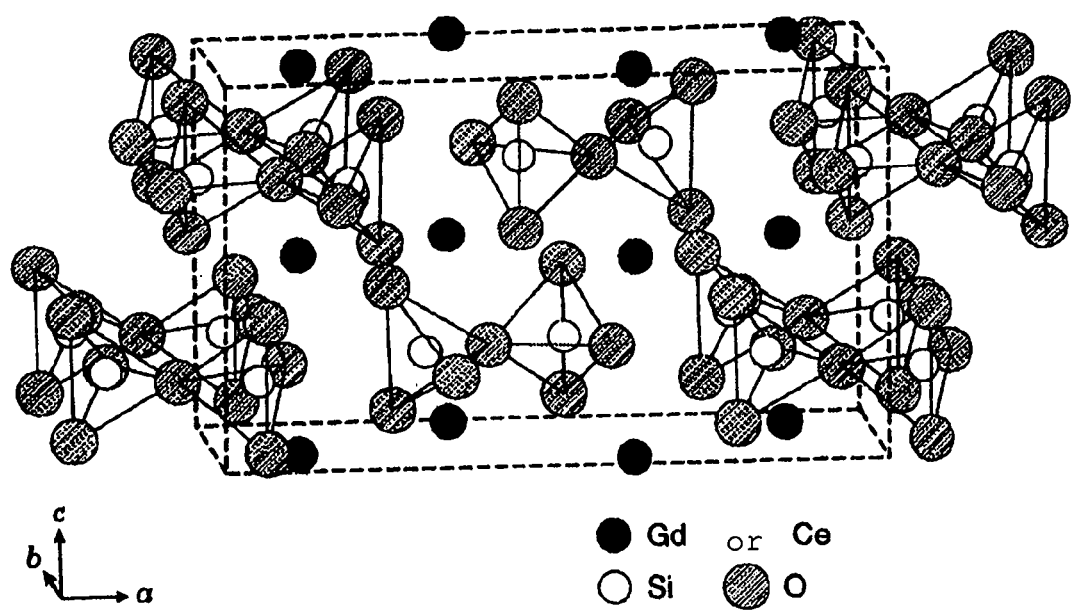
FIG. 2 is a diagram illustrating the crystalline structure of the fluorescent substance prepared in Example 1.

Then each powdery sample was inspected for the crystalline structure according to the X-ray diffraction analysis and for the wavelengths and intensities of the excited light rays and emitted light rays by the fluorescent spectroscopic analysis. The results of the X-ray diffraction analysis indicate that the sample after the calcinations showed the diffraction pattern as shown in FIG. 1 and the pattern was subjected to the Rietveld analysis and as a result, it was found that the sample had a crystal structure of the $Gd_2Si_2O_7$ type one having an orthorhombic crystal system (space group: $Pna2_1$) as shown in FIG. 2.

On the other hand, the results of the fluorescent spectroscopic analysis indicate that the sample obtained after the calcination shows a maximum excitation by the irradiation with ultraviolet light rays having a wavelength of about 330 nm and a maximum light-emission at a wavelength of about 360 nm or the strongest emission of the light. The luminous output (power) intensity at a wavelength of 360 nm was found to be 140% with respect to the maximum output value observed for the powdered GSO single crystal. When this sample was irradiated with X-rays, the emission of purple light rays was recognized with the naked eyes. This fact clearly indicates that the light-emission mechanism of the composition of the present invention due to the radiation stimulus is quite similar to that encountered when it is optically stimulated and as a result, the similar light-emission could likewise be recognized even by electron beam, electric field and stress stimuli.

EXAMPLE 2

The same procedures used in Example 1 were repeated using the same component elements used therein to thus form a sample having a different value of x in the foregoing general formula (x=0.01, 0.02, 0.04, 0.06, 0.08, 0.10 or 0.20) and then the resulting sample was calcined at 1500° C. for 8 hours in the air to thus give each corresponding powdery sample.

As a result of the irradiation of each sample with the light rays from a xenon lamp, it was found that all of the samples could emit purple light rays.

In addition, the crystalline phases of these samples were identified according to the X-ray diffraction analysis and the results thus obtained indicate that each of the samples whose x values fell within the range: $0<x\leq0.06$ (or the samples whose x values are 0.01, 0.02, 0.04 and 0.06) has the same crystalline structure as that of the sample prepared in Example 1, while each of the samples whose x values fell within the range: $0.06<x\leq0.2$ (or the samples whose x values are 0.08, 0.10 and 0.20) has a crystalline structure close to that observed for $Eu_2Si_2O_7$ (Powder Diffraction File No. 23-0247).

The samples were examined by the fluorescent spectroscopic analysis. The results thus obtained indicate that all of the samples satisfying the requirement: $0<x\leq0.06$ show the maximum excitation by the UV light rays having a wavelength of about 330 nm and the maximum luminescence at an wavelength of about 360 nm. On the other hand, the results obtained likewise indicate that the samples satisfying the requirement: $0.06<x\leq0.2$ show the maximum excitation by the UV light rays having a wavelength of about 320 nm and the maximum luminescence at an wavelength of about 400 nm. The maximum luminous strengths were observed at x values of 0.02 and 0.10, respectively and the luminous power strengths of these samples were found to be 240% and 220% relative to the maximum power observed for the powdered GSO single crystal.

EXAMPLE 3

In the same procedures used in Example 1, aqueous solutions of raw materials for Gd and Ce were admixed together in such a manner that the atomic ratio: Gd/Ce was equal to 98/2 or 90/10, the ethanol solution of silica sol used in Example 1 was added to the resulting mixture to thus prepare a variety of precursor solutions whose atomic ratio: (Gd+Ce)/Si ranged from 33/67 (resulted in a single phase similar to that of $Gd_2Si_2O_7$) to 20/80 (resulted in a composition comprising $Gd_2Si_2O_7+SiO_2$). The same procedures used in Example 1 were repeated using these solutions to thus prepare a powdery or solid molded sample which was calcined at 1500° C. for 8 hours and the crystalline phases of these samples were then identified by the X-ray diffraction analysis. As a result, it was found that all of the samples whose atomic ratio: Gd/Ce was 98/2 were compositions each comprising $Gd_2Si_2O_7$ type crystals, while all of the samples whose atomic ratio: Gd/Ce was 90/10 were compositions each comprising $Eu_2Si_2O_7$ type crystals.

When all of the samples were irradiated with the light rays emitted from a xenon lamp, there was observed the emission of purple light rays.

On the other hand, the results of the fluorescent spectroscopic analysis indicate that each of the samples whose atomic ratio: Gd/Ce is 98/2 shows light-emission which has a maximum value at a wavelength of about 360 nm, while each of the samples whose atomic ratio: Gd/Ce is 90/10 shows light-emission which has a maximum value at a wavelength of about 400 nm. The luminous output intensities of these samples were found to be not less than 150% of the maximum output value observed for the GSO single crystal.

EXAMPLE 4

The same procedures used in Example 1 were repeated except that Tb was substituted for Ce to thus prepare samples similar to those prepared in Example 1. When irradiating each sample with the light rays emitted from a xenon lamp, it was confirmed that the sample calcined at 1500° C. emitted green light rays of a high intensity. Then the crystalline phases of these samples were identified by the X-ray diffraction analysis and as a result, it was found that the sample calcined at 1500° C. had the same crystalline structure observed for the sample prepared in Example 1.

EXAMPLE 5

The same procedures used in Example 1 were repeated except that Eu was substituted for Ce to thus prepare samples similar to those prepared in Example 1. When irradiating each sample with the light rays emitted from a xenon lamp, it was confirmed that the sample calcined at 1500° C. emitted red light rays of a high intensity. Then the crystalline phases of these samples were identified by the X-ray diffraction analysis and as a result, it was found that the sample calcined at 1500° C. had the same crystalline structure observed for the sample prepared in Example 1.

EXAMPLE 6

There were admixed the aqueous solutions of the raw materials for Gd and Ce used in Examples 1 and 2 and a silica sol solution (a hydrolyzate of tetramethyl orthosilicate containing 2 mole/L of Si) in such a manner that the molar ratio: Ce/Gd/Si was adjusted to (1) 0.1/2/97.9, (2) 0.1/5/94.9 and (3) 0.1/10/89.9 to thus synthesize 150 g each of the corresponding precursors. Then, a part of each precursor was casted in a Petri dish having a diameter of 50 mm, treated at 70° C. for 12 hours to thus form a gel and then the resulting gel was dried at 120° C. for 8 hours to give 3.2 g of a dried gel. This was then burnt at 800° C. for 4 hours in an oxygen gas-containing atmosphere and the temperature of the same was raised up to 1300° C. over 5 hours in a helium gas atmosphere to thus convert it into glass. The resulting glass material was found to be partially transparent. A part of the glass was pulverized and subjected to the X-ray diffraction analysis and as a result, it was confirmed that the same crystalline substance observed in Example 1 was included in the silica glass matrix. When irradiating these samples with the light rays from a xenon lamp, it was confirmed that the sample (1) whose Gd content was 2 mole % emitted quite weak purple light rays and that the samples (2) and (3) whose Gd content was not less than 5 mole % emitted strong purple light rays. Moreover, the results of the fluorescent spectroscopic analysis indicate that the samples emitted light rays which had a maximum at a wavelength of about 360 nm or about 400 nm.

EXAMPLE 7

In Example 1, the aqueous solutions of raw materials for Gd and Ce were admixed together such that the atomic ratio: Gd/Ce was set at 98/2 and dropwise added to a silica slurry and a powdery sample obtained after the completion of the dropwise addition was filtered and dried to give dried powder. In this respect, the silica slurry was one prepared by dispersing silica fine particles (having an average particle size of not more than 1 μm) so that the ratio: (Gd+Ce)/Si fell within the range of from 20/80 to 8/92 and then dispersing the dispensed silica fine particles in 80 mL of 25% aqueous ammonia. Then sodium hydroxide was added to and admixed with the resulting dried powder in an amount of 15% by mass, followed by the calcination of the powder at 1100° C. and fusion thereof using a gas burner to thus obtain a composition comprising a fluorescent substance dispersed in a glass matrix. This composition was transparent and emitted blue light rays when irradiating it with ultraviolet rays.

In addition, fluorescent substance-containing composition whose matrix was borosilicate glass, quartz or cristobalite could be obtained from the foregoing dried sample, with or without addition of boric acid, and an alkali metal other than sodium to the sample. The shapes of these samples thus prepared could easily be changed by additionally heating the compositions.

EXAMPLE 8

There were pulverized and admixed the powdery sample (fluorescent substance) having an x of 0.02 and prepared in Example 2 and quartz glass powder in a mortar to thus prepare a fluorescent substance-containing composition having a content of the fluorescent substance ranging from 0 to 10% by mass (more specifically, 0, 1, 2, 4, 5, 8 or 10% by mass).

A UV lamp was placed at a point 3 cm apart from the fluorescent composition, each sample was irradiated with the light from the lamp under the presence of the light rays from a fluorescent lamp to thus visually observe the emission of purple light rays. As a result, there was not observed any light emission for the sample having fluorescent substance content of 0% by mass, there were observed slight light emission for the samples having fluorescent substance contents of 1, 2 and 4% by mass; distinct light emission for the samples having fluorescent substance contents of 5 and 8% by mass; and strong light emission for the sample having fluorescent substance content of 10% by mass.

INDUSTRIAL APPLICABILITY

The fluorescent substance of the present invention has a high luminous efficiency and the fluorescent composition of the present invention is excellent in the processability and a high luminous efficiency. Both of them can suitably be used as, for instance, scintillator materials.

What is claimed is:

1. A radiation detector comprising a fluorescent substance represented by the following general formula: $(A_{1-x}B_x)_2 Si_2O_7$, wherein A is Gd, B is Ce or mixtures of Ce with at least one other rare earth element excluding Gd, Y, Lu and La, and x is a numerical value specified by the formula: $0<x\leq0.2$.

2. The radiation detector of claim 1, wherein x is a numerical value specified by the formula: $0<x\leq0.06$, and wherein the substance has an orthorhombic crystal system having a Pna $2_1$ space group.

3. The radiation detector of claim 1, comprising a fluorescent composition which includes at least 5% by mass of said fluorescent substance.

4. The radiation detector of claim 1, comprising a fluorescent composition which includes a matrix and at least 5% by mass of said fluorescent substance, incorporated into the matrix.

5. The radiation detector of claim 4, wherein the matrix is at least one member selected from the group consisting of silica glass, borosilicate glass, quartz and cristobalite.

6. The radiation detector of claim 4, wherein the matrix is a polymer resin.

7. The radiation detector of claim 2, comprising a fluorescent composition which includes at least 5% by mass of said fluorescent substance.

8. The radiation detector of claim 2, comprising a fluorescent composition which includes a matrix and at least 5% by mass of said fluorescent substance incorporated into the matrix.

9. The radiation detector of claim 8, wherein the matrix is at least one member selected from the group consisting of silica glass, borosilicate glass, quartz and cristobalite.

10. The radiation detector of claim 8, wherein the matrix is a polymer resin.

11. The radiation detector of claim 1, wherein x is a numerical value specified by the formula $0<x\leq0.06$.

12. The radiation detectors of claim 2, wherein x is $0.005\leq x\leq0.06$.

* * * * *